United States Patent
Lee et al.

(10) Patent No.: US 10,043,488 B2
(45) Date of Patent: Aug. 7, 2018

(54) ELECTRONIC DEVICE AND METHOD OF CONTROLLING DISPLAY THEREOF

(71) Applicant: Samsung Electronics Co., Ltd., Gyeonggi-do (KR)

(72) Inventors: Hyungmin Lee, Seoul (KR); Hyosang Bang, Seoul (KR); Jeeyeun Wang, Seoul (KR); Jaemyoung Lee, Seoul (KR); Joohyung Lee, Seoul (KR); Chulho Jang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/818,952

(22) Filed: Aug. 5, 2015

(65) Prior Publication Data

US 2016/0042723 A1 Feb. 11, 2016

(30) Foreign Application Priority Data

Aug. 7, 2014 (KR) ........................ 10-2014-0101621

(51) Int. Cl.
| | | |
|---|---|---|
| G09G 5/00 | (2006.01) |
| G09G 5/377 | (2006.01) |
| G06F 1/16 | (2006.01) |
| G06F 3/0481 | (2013.01) |
| G06T 3/00 | (2006.01) |
| G09G 5/14 | (2006.01) |
| G06T 7/70 | (2017.01) |

(52) U.S. Cl.
CPC ............ *G09G 5/377* (2013.01); *G06F 1/163* (2013.01); *G06F 3/0481* (2013.01); *G06T 3/0056* (2013.01); *G06T 7/70* (2017.01); *G09G 5/14* (2013.01); *G06F 2200/1637* (2013.01); *G06F 2203/04804* (2013.01); *G06T 2207/20221* (2013.01)

(58) Field of Classification Search
None
See application file for complete search history.

(56) References Cited

U.S. PATENT DOCUMENTS 7,050,020 B2   5/2006  Uehara et al.
8,884,928 B1 *  11/2014  Baldwin ............... G06F 3/0488
                                                    345/173

(Continued)

FOREIGN PATENT DOCUMENTS

EP       2 752 752        7/2014
KR       10-0605456       7/2006

(Continued)

OTHER PUBLICATIONS

International Search Report dated Nov. 17, 2015 issued in counterpart application No. PCT/KR2015/008260, 3 pages.

(Continued)

*Primary Examiner* — Peter Hoang
(74) *Attorney, Agent, or Firm* — The Farrell Law Firm, P.C.

(57) ABSTRACT

An electronic device and a method of controlling a display of the electronic device are provided. The method includes arranging a first image and a second image vertically on different layers; measuring a tilt of the electronic device; and displaying at least one of the first image and second image by controlling transparency of the first image based on the measured tilt.

13 Claims, 26 Drawing Sheets

(56) References Cited

U.S. PATENT DOCUMENTS

| | | |
|---|---|---|
| 2010/0045570 A1 | 2/2010 | Takata |
| 2012/0050309 A1 | 3/2012 | Tsuchida et al. |
| 2012/0268391 A1 | 10/2012 | Somers |
| 2013/0050191 A1 | 2/2013 | Fu |
| 2013/0167057 A1 | 6/2013 | Kwak et al. |
| 2013/0229330 A1 | 9/2013 | Elyada et al. |
| 2014/0063611 A1 | 3/2014 | Raymond et al. |
| 2014/0184530 A1 | 7/2014 | Hyun |

FOREIGN PATENT DOCUMENTS

| | | |
|---|---|---|
| KR | 10-0716556 | 5/2007 |
| WO | WO 2013/094991 | 6/2013 |

OTHER PUBLICATIONS

European Search Report dated Dec. 4, 2015 issued in counterpart application No. 15179841.0-1972, 8 pages.

\* cited by examiner

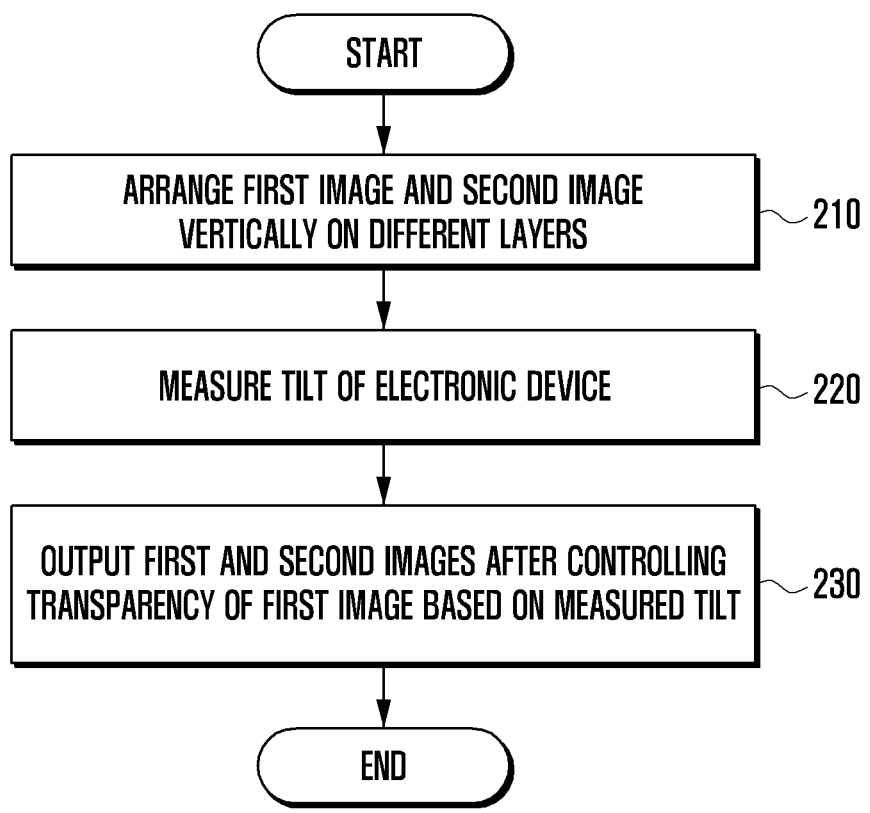

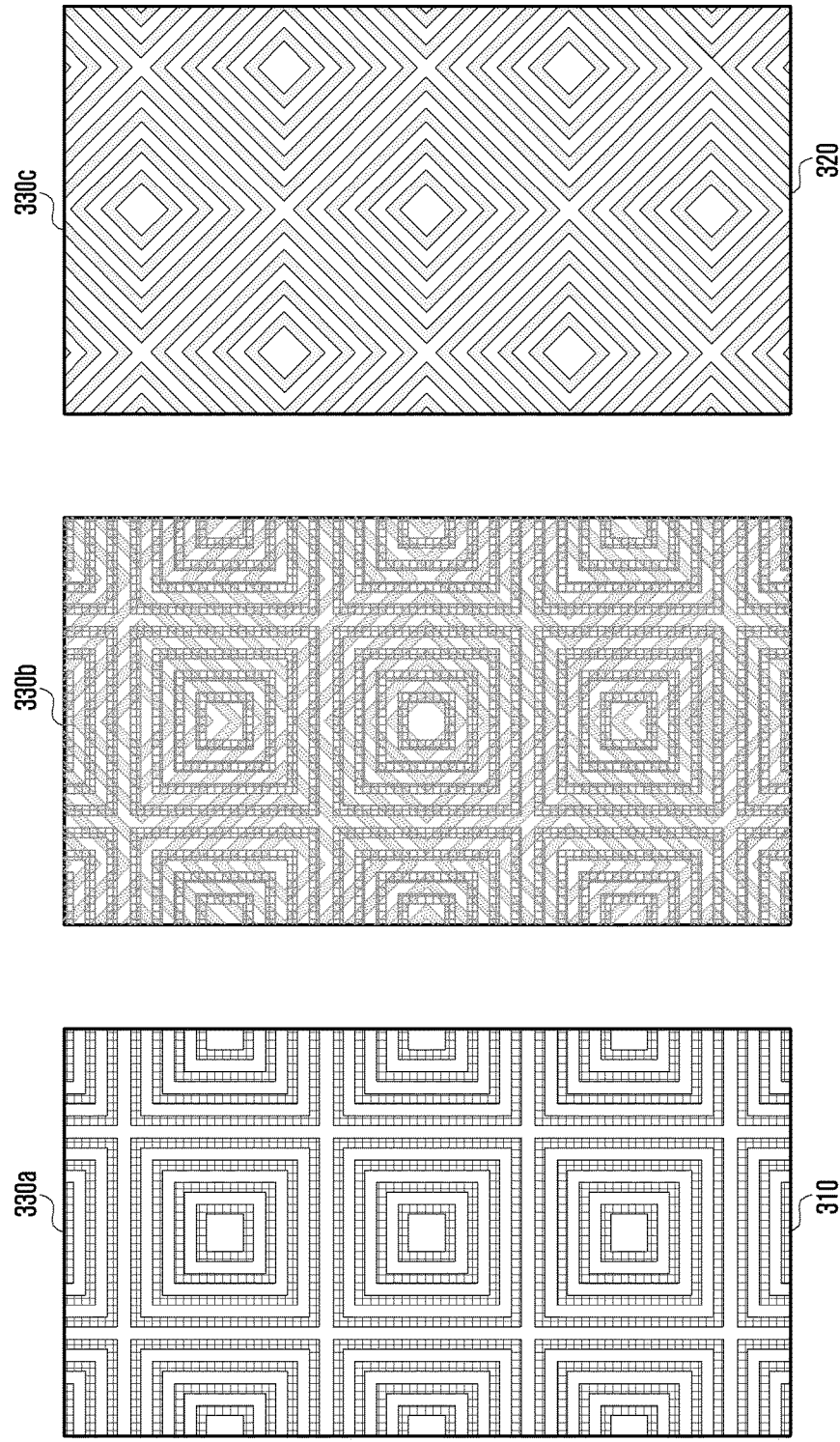

ELECTRONIC DEVICE AND METHOD OF CONTROLLING DISPLAY THEREOF

PRIORITY

This application claims priority under 35 U.S.C. § 119(a) to Korean Patent Application No. 10-2014-0101621, which was filed in the Korean Intellectual Property Office on Aug. 7, 2014, the entire content of which is incorporated herein by reference.

BACKGROUND OF THE INVENTION

1. Field of the Invention

The present invention relates generally to a technology for controlling a screen display according to a tilt of an electronic device.

2. Description of the Prior Art

Portable electronic devices often have limitations on their display sizes in light of the portability and functions thereof. For example, the display size of a smart phone may be determined based on a hand size of a user, and the display size of a smart wrist watch may be determined based on wrist size of the user in determining wearability.

In general, one image or function may be provided through one display. Although a technology of splitting the screen, i.e., a split screen display, and providing various images is used, the use of a split screen display is often limited in a portable electronic device because the display size of the portable electronic device is limited.

Accordingly, in order to provide an image or function different from an image or function currently being displayed, a separate input should be received from the user.

SUMMARY OF THE INVENTION

Accordingly, the present invention is designed to address at least the problems and/or disadvantages described above and to provide at least the advantages described below.

An aspect of the present invention is to provide a method of displaying various images or functions through a display according to an intuitive control by the user, in consideration of portability and user convenience.

In accordance with an aspect of the present invention, a method of controlling a display of an electronic device is provided. The method includes arranging a first image and a second image vertically on different layers; measuring a tilt of the electronic device; and displaying at least one of the first image and second image by controlling transparency of the first image based on the measured tilt.

In accordance with another aspect of the present invention, an electronic device is provided. The electronic device includes a display unit; a sensor unit that measures a tilt of the electronic device; and a controller that arranges a first image and a second image vertically on different layers and displays, through the display unit, at least one of the first image and second image by controlling transparency of the first image based on the measured tilt.

In accordance with another aspect of the present invention, a method of controlling a display of an electronic device is provided. The method includes arranging a first image, a second image, and third image vertically on different layers; measuring a tilt of the electronic device; and displaying at least one of the first image, the second image, and the third image by controlling transparency of the first image and the second image based on the measured tilt.

BRIEF DESCRIPTION OF THE DRAWINGS

The above and other aspects, features, and advantages of certain embodiments of the present invention will be more apparent from the following detailed description, taken in conjunction with the accompanying drawings, in which:

FIG. 2 is a flowchart illustrating a display control method of an electronic device according to an embodiment of the present invention;

FIGS. 3A to 3C illustrate an example of a display control method of an electronic device according to an embodiment of the present invention;

DETAILED DESCRIPTION OF EMBODIMENTS OF THE INVENTION

Figure 1:
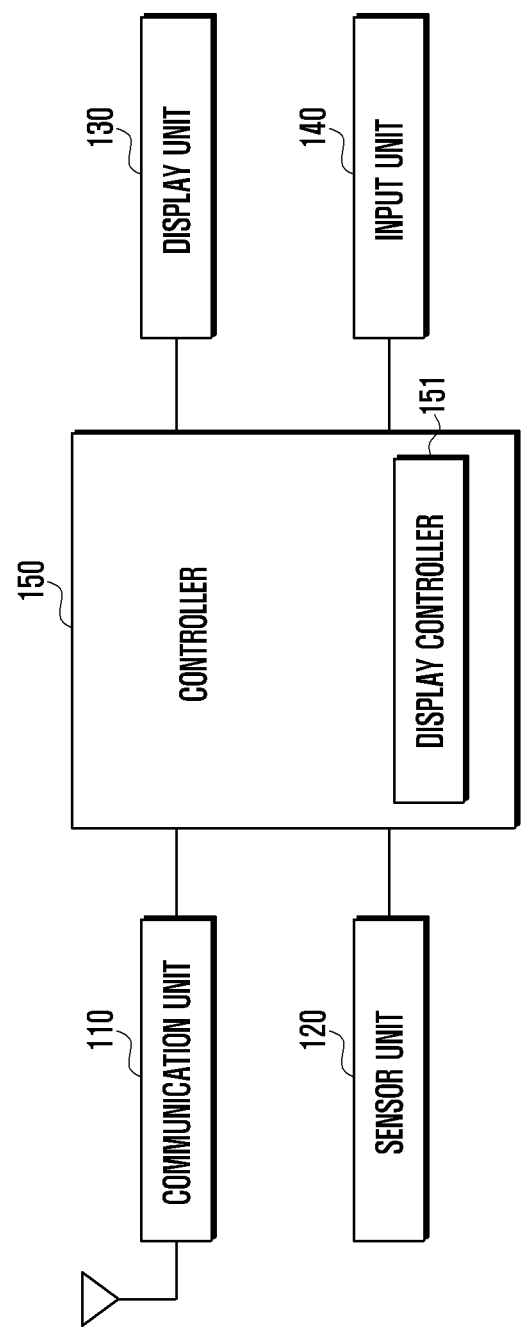
FIG. 1 is a block diagram illustrating an electronic device according to an embodiment of the present invention.

Hereinafter, various embodiments of the present invention will be described with reference to the accompanying, to which modifications and changes may be made therein. Therefore, although the present invention will be described in conjunction with particular embodiments, as illustrated in the accompanying drawings, it should be understood that the present invention is not limited to these particular embodiments, but includes all modifications, equivalents, and/or alternatives within the spirit and scope of the present invention.

In describing the drawings, similar reference numerals are used to designate similar elements.

The terms used in this application are for describing particular embodiments only, and are not intended to limit the present invention. As used herein, the singular forms are intended to include the plural forms as well, unless the context clearly indicates otherwise.

Unless defined differently, all terms used herein, which include technical terminologies or scientific terminologies, have the same meanings as understood by a person skilled in the art to which the present invention belongs. Such terms as those defined in a generally used dictionary are to be interpreted to have the same contextual meanings as normally understood in the relevant field of art, and are not to be interpreted to have ideal or excessively formal meanings unless clearly defined in the present specification.

Herein, the expressions "include" or "may include" refer to existence of a corresponding function, operation, or element, and does not limit one or more additional functions, operations, or elements. Further, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

The expression "or" includes any or all combinations of words enumerated together. For example, the expression "A or B" may include A, may include B, or may include both A and B.

Herein, expressions including ordinal numbers, such as "first" and "second," etc., may modify various elements. However, such elements are not limited by the above expressions. For example, the above expressions do not limit the sequence and/or importance of the elements but are used merely for the purpose of distinguishing an element from the other elements. For example, a first user device and a second user device indicate different user devices, although both of them are user devices. For example, a first element may be referred to as a second element, and similarly, a second element may be referred to as a first element without departing from the scope of the present invention.

When an element is referred to as being "connected to" or "accessed by" other elements, it should be understood that not only the element is directly connected to or accessed by the other elements, but also another element may exist between them. However, when an element is referred to as being "directly coupled" or "directly connected" to any other element, it should be understood that no element is interposed therebetween.

Herein, an electronic device may be a device including a display. For example, the electronic device may include at least one of a smart phone, a tablet Personal Computer (PC), a mobile phone, a video phone, an e-book reader, a desktop PC, a laptop PC, a netbook computer, a Personal Digital Assistants (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch), etc.

Further, the electronic device may be a smart home appliance, e.g., a television (TV), a Digital Video Disk (DVD) player, an audio receiver, a refrigerator, an air conditioner, a vacuum cleaner, an oven, a microwave oven, a washing machine, an air cleaner, a set-top box, a TV box (e.g., Samsung HomeSync®, Apple TV®, or Google TV®), a game console, an electronic dictionary, an electronic key, a camcorder, an electronic picture frame, etc.

The electronic device may also be a medical device (for example, Magnetic Resonance Angiography (MRA) device, Magnetic Resonance Imaging (MRI) device, Computed Tomography (CT) device, a scanning machine, ultrasonic wave device, etc.), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass, etc.), avionics equipment, a security device, and/or an industrial or home robot.

Further, the electronic device may be a part of furniture or a building/structure, an electronic board, an electronic signature receiving device, a projector, and various kinds of measuring instruments (e.g., a water meter, an electric meter, a gas meter, and a radio wave meter).

Additionally, the electronic device may be a combination of one or more of the aforementioned various devices.

Further, the electronic device is not limited to the aforementioned devices.

FIG. 1 is a block diagram illustrating an electronic device according to an embodiment of the present invention.

Referring to FIG. 1, the electronic device includes a communication unit 110, a sensor unit 120, a display unit 130, an input unit 140, and a controller 150.

The communication unit 110 connects communication between the electronic device and another electronic device or a server. For example, the communication unit 110 may be connected to a network through wireless communication or wired communication in order to communicate with an external device or a server. For example, the wireless communication may include Wi-Fi (Wireless Fidelity), Bluetooth (BT), Near Field Communication (NFC), Global Positioning System (GPS) and cellular communication (e.g., Long Term Evolution (LTE), LTE-A, Code Division Multiple Access (CDMA), Wideband CDMA (WCDMA), Universal Mobile Telecommunication System (UMTS), Wireless Broadband (WiBro), and/or Global System for Mobile communication (GSM)), and the wired communication may include a Universal Serial Bus (USB), a High Definition Multimedia Interface (HDMI), Recommended Standard 232 (RS-232), and/or a Plain Old Telephone Service (POTS).

The sensor unit 120 measures a physical quantity or detects an operation state of the electronic device, and converts the measured or detected information to an electrical signal. In accordance with an embodiment of the present invention, the sensor unit 120 measures a tilt of the electronic device. For example, the sensor unit 120 may include a slope sensor, an acceleration sensor, and/or a gyro sensor, which measure the tilt of the electronic device. The sensor unit 120 may measure the tilt of the electronic device in real time. The sensor unit 120 may measure the tilt of the electronic device based on at least one of a first axis and a second axis, which is orthogonal to the first axis, when the display 130 of the electronic device 100 is parallel to the ground.

The display unit 130 includes a display panel that outputs various images. For example, an image output by the display unit 130 may include information, contents, etc., provided by the electronic device, and may also include a User Interface (UI) having various functions for interaction between the electronic device and a user.

The display panel may arrange a plurality of images on different virtual layers and output the images through one screen according to a control by the controller 150. For example, the display panel may arrange a first image and a second image on upper and lower layers, respectively, and output the images. The display panel may output the first image and the second image after controlling transparency of the first image on the upper layer according to a control by the controller 150.

Examples of the display panel include a Liquid Crystal Display (LCD) or an Active Matrix Organic Light Emitting Diode (AM-OLED), which may be flexible, transparent, or wearable.

The input unit 140 includes various input devices that receive various inputs from the user. For example, the input unit 140 may include a touch panel, a pen sensor, a key, an ultrasonic input device, etc. For example, the touch panel may recognize a touch input through at least one of a capacitive type, a resistive type, an infrared type, an electromagnetic induction type, and an ultrasonic type. When the touch panel recognizes the capacitive type touch input, physical contact or proximity recognition is possible.

The electronic device may also include a touch screen including the touch panel of the display unit 130 and the display panel, which are configured as one module. For example, the pen sensor may be implemented using a method identical or similar to a method of receiving a touch input of a user, or using a separate recognition sheet. The key may include a physical button, an optical key, or a keypad. The ultrasonic input device is a device that detects an acoustic wave by a microphone of the electronic device 100 through an input device generating an ultrasonic signal to identify data and may perform wireless recognition.

The electronic device may also receive a user input from an external device (for example, another electronic device or a server) connected thereto by using the communication unit 110.

The controller 150 controls general operations of the electronic device and a signal flow between internal components of the electronic device, performs data processing functions, and controls power supply to the components from a battery.

The controller 150 includes a display controller 151, which may arrange a plurality of images on different layers and output the images through the display unit 130. Further, the display controller 151 may control transparency of the image on the upper layer based on the tilt of the electronic device, as measured by the sensor unit 120.

Accordingly, the screen displayed on the display unit 130 may be changed according to the tilt of the electronic device. For example, when transparency of the image on the upper layer is configured to be lowest, only the image on the upper layer may be displayed through the screen. When the transparency of the image on the upper layer gradually increases, the screen in which the image on the upper layer and the image on the lower layer overlap each other may be displayed. When the transparency of the image on the upper layer is configured to be highest, only the image on the lower layer may be displayed through the screen.

A corresponding relationship between the tilt of the electronic device and the transparency of the upper layer may be configured based on various rules.

Further, the display controller 151 may arrange images on three or more layers and control the transparency of the upper layers, according to the tilt of the electronic device.

Based on the foregoing, the display controller 151 may control the switching and displaying of a plurality of images through the screen based on the tilt of the electronic device.

FIG. 2 is a flowchart illustrating a display control method of an electronic device according to an embodiment of the present invention. For example, the method of FIG. 2 will be described as being performed by the electronic device illustrated in FIG. 1.

Referring to FIG. 2, in step 210, the controller 150 arranges a first image and a second image vertically on different layers. The first image may be arranged on the upper layer and the second image may be arranged on the lower layer. For example, the images may include information, contents, etc., provided by the electronic device and may also include a UI having various functions for interaction between the electronic device 100 and the user. The first image and the second image may include at least one of different patterns, colors, information, contents, and UIs.

Figure 3A:
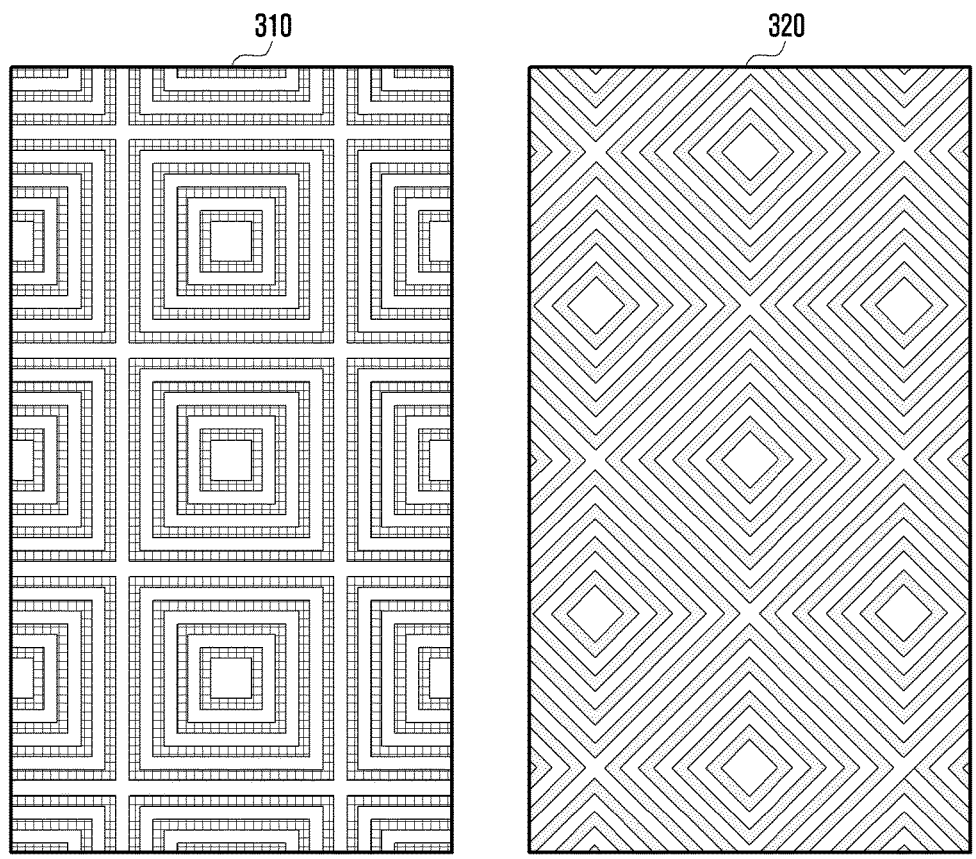
Figure 3B:
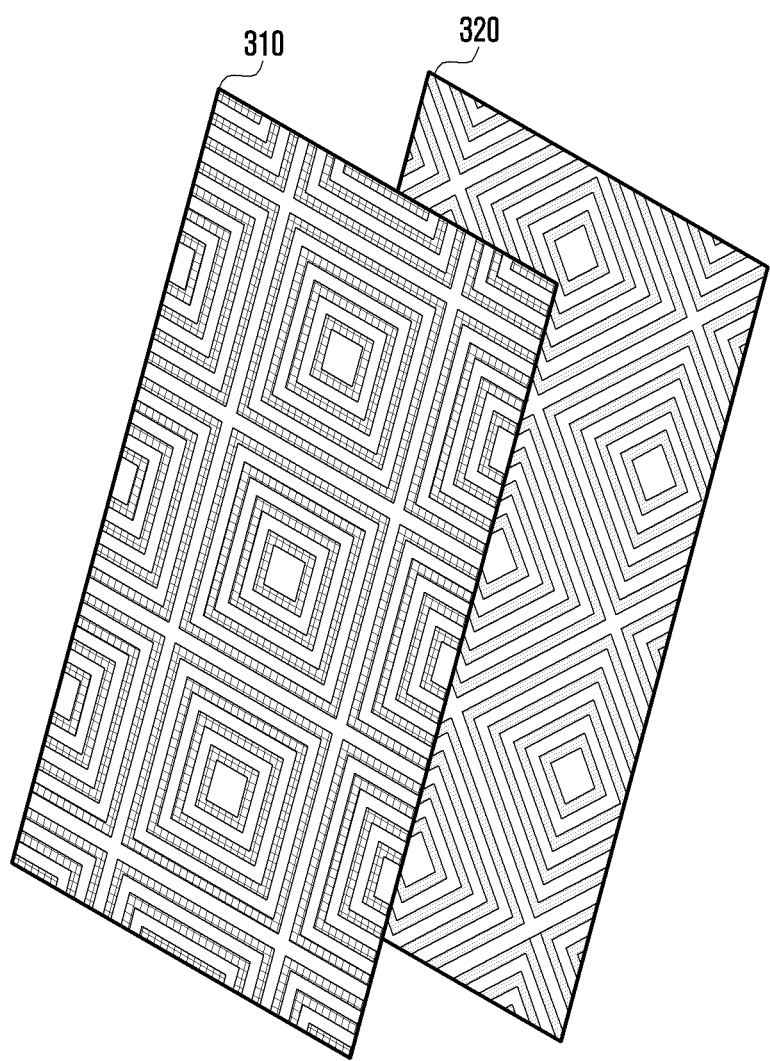

FIGS. 3A to 3C illustrate an example of a display control method of an electronic device according to an embodiment of the present invention.

Referring to 3A and 3B, a first image 310 and a second image 320 include different patterns from each other, and the first image 310 is arranged on the upper layer and the second image 320 is arranged on the lower layer.

Referring again to FIG. 2, in step 220, the controller 150 measures the tilt of the electronic device through the sensor unit 120.

Figure 4A:
FIGS. 4A and 4B illustrate examples of controlling a tilt of an electronic device according to an embodiment of the present invention.
Figure 4B:
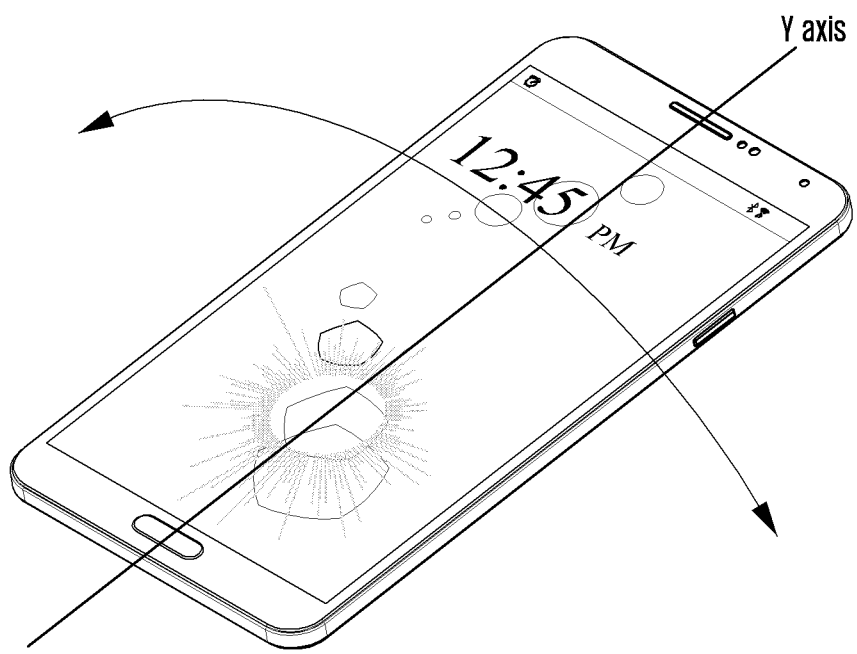

FIGS. 4A and 4B illustrate examples of controlling a tilt of an electronic device according to an embodiment of the present invention.

Referring to FIGS. 4A and 4B, the sensor unit 120 may measure the tilt of the electronic device based on at least one axis of a first axis (for example, an X axis, as illustrated in FIG. 4A) and a second axis (for example, a Y axis, as illustrated in FIG. 4B), which is orthogonal to the first axis, where the display of the electronic device is parallel to the ground. For example, the sensor unit 120 may measure tilts from 0 degrees to 360 degrees based on the first axis and tilts from 0 degrees to 360 degrees based on the second axis.

Referring again to FIG. 2, in step 230, the controller 150 outputs the first and second images, after controlling transparency of the first image based on the tilt of the electronic device, as measured through the sensor unit 120.

For example, referring to FIG. 3C, when the transparency of the first image 310 is configured to be lowest according to the measured tilt of the electronic device, the first image 310 may be displayed on the screen of the display 130 as indicated by reference numeral 330a. When the transparency of the first image 310 is configured to be highest according to the tilt of the electronic device, the second image 320 on the lower layer may show through the first image 310 on the upper layer as indicated by reference numeral 330c. When the tilt of the electronic device 100 changes, the transparency of the first image 310 may change between the highest point and the lowest point in accordance with the measured tilt, and accordingly the first image 310 and the second image 320 may be displayed together as indicated by reference numeral 330b. Thus, the display unit 130 may clearly display the second image 320 as the first image 310 becomes more transparent and may clearly display the first image 310 as the first image 310 becomes more opaque.

Figure 5:
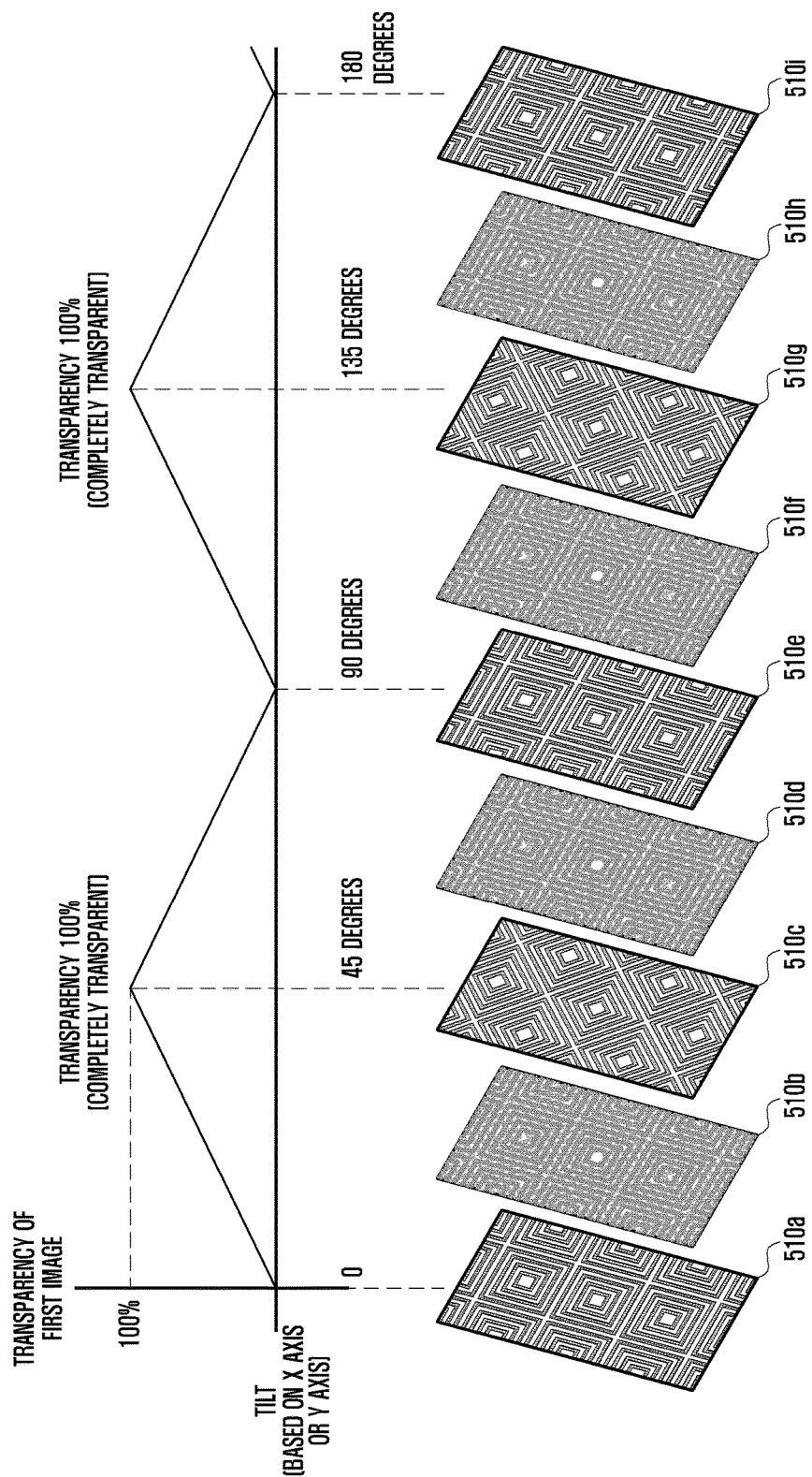
FIG. 5 illustrates an example of a display control method of an electronic device based on tilt according to an embodiment of the present invention.

FIG. 5 illustrates an example of a display control method of an electronic device based on a measured tilt according to an embodiment of the present invention.

Referring to FIG. 5, the transparency of the first image 310 changes, for example, linearly between a lowest point and a highest point on a cycle of a 45 degree tilt. When the electronic device has a 0 degree tilt, based on the X axis or the Y axis, the transparency of the first image 310 is 0, corresponding to a lowest value. At this time, the first image 310 is displayed through the screen as indicated by reference numeral 510a.

When the tilt gradually increases and the transparency of the first image 310 gradually increases, the first image 310 displayed on the screen as indicated by reference numeral 510b may gradually fade and the second image 320 may become gradually visible.

When the tilt corresponds to 45 degrees, the transparency of the first image 310 is 100, corresponding to a highest value. At this time, the second image 320 is displayed through the screen as indicated by reference numeral 510c.

When the tilt gradually increases from 45 degrees to 90 degrees, the transparency of the first image 310 gradually lowers, and accordingly the second image 320 displayed through the screen as indicated by reference numeral 510*d* gradually fades as the first image 310 becomes more visible.

In the remaining tilt intervals, clarity of the first image 310 and the second image 320 output through the screen may be controlled according to the transparency of the first image 310 as indicated by reference numerals 510*e* to 510*i*.

Figure 6A:
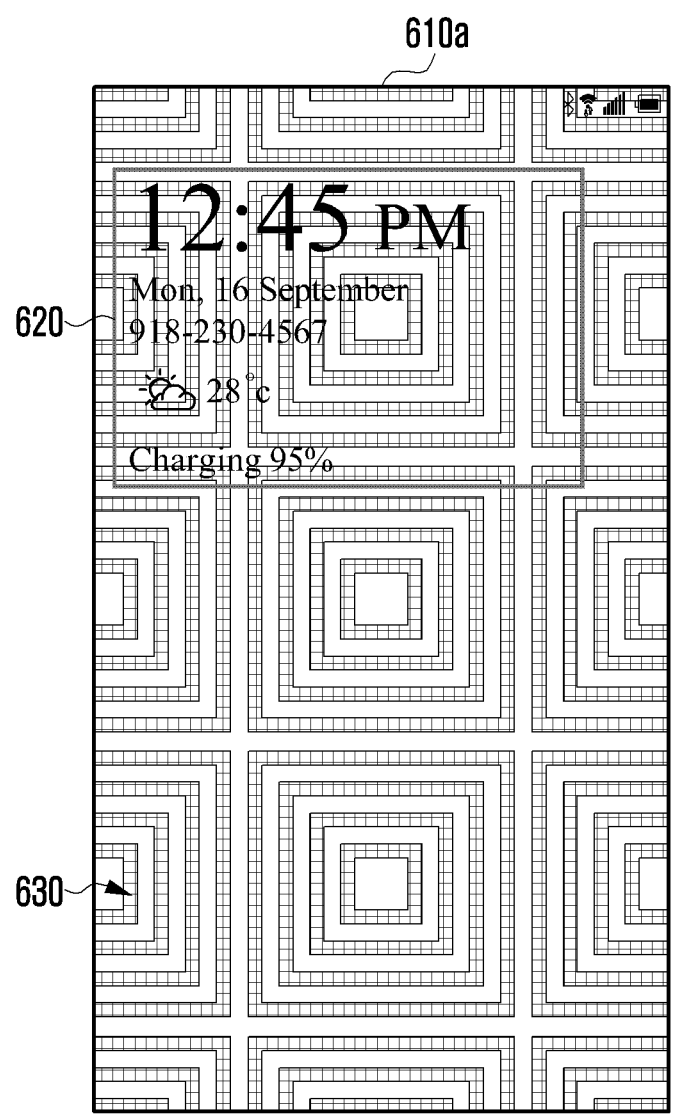
FIGS. 6A to 6C illustrate an example of a display control method of an electronic device according to an embodiment of the present invention.
Figure 6B:
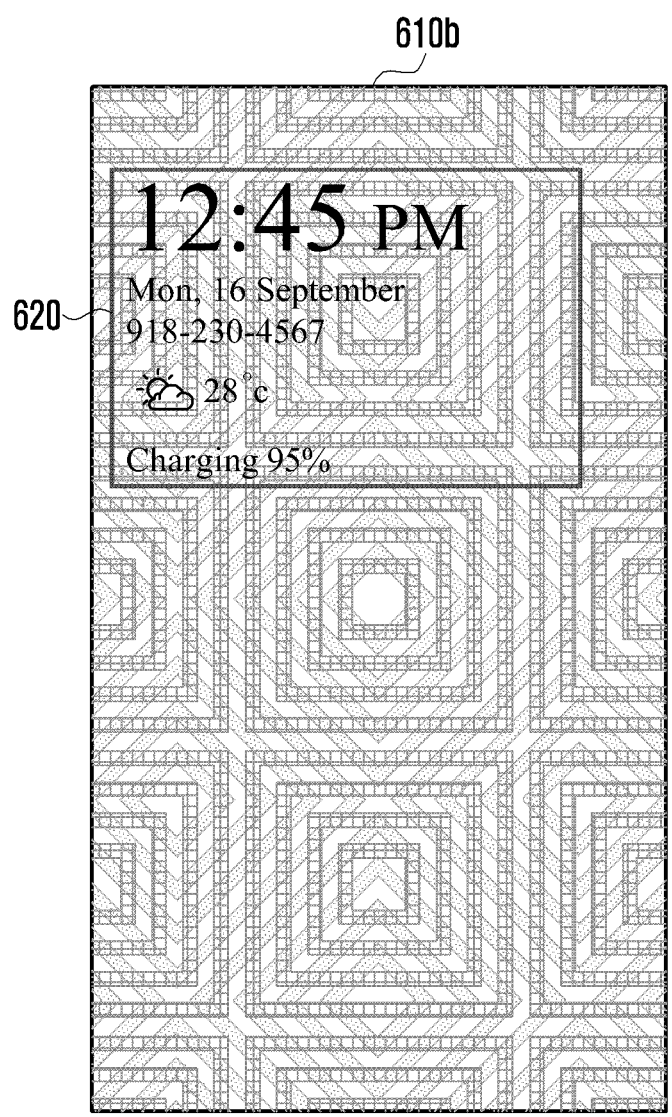
Figure 6C:
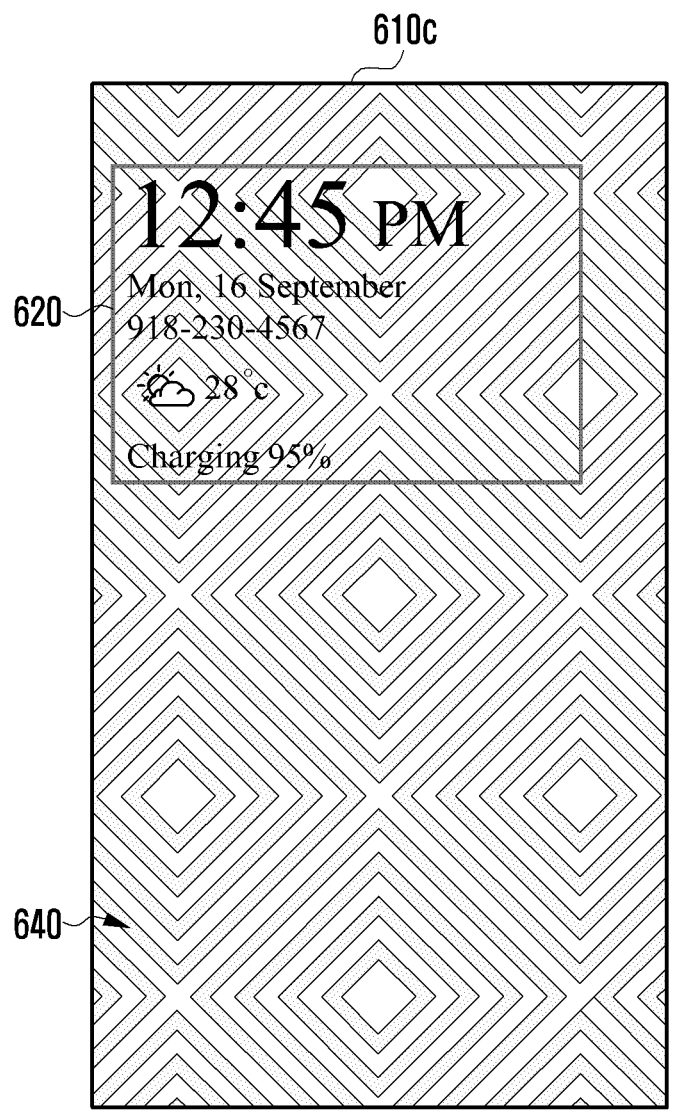

FIGS. 6A to 6C illustrate an example of a display control method of an electronic device according to an embodiment of the present invention.

Referring to FIG. 6A, a lock screen is displayed on the electronic device. As illustrated in FIGS. 6A to 6C, a pattern of the lock screen changes as indicated by reference numerals 610*a* to 610*c*, according to the tilt of the electronic device.

For example, the electronic device arranges a first image 630 and a second image 640, which have different patterns from each other, vertically on different layers, and outputs the images. When the tilt of the electronic device corresponds to a first tilt, transparency of the first image 630 on the upper layer is configured to be at the lowest point and the first image 630 is displayed through the screen as indicated by reference numeral 610*a*. However, when the tilt of the electronic device corresponds to a second tilt, the transparency of the first image 630 is configured to be at the highest point and the second image 640 is visible through the screen, as indicated by reference numeral 610*c*.

When the tilt of the electronic device 100 corresponds to a tilt between the first tilt and the second tilt, the transparency of the first image 630 is at a value between the lowest point and the highest point in accordance with the measured tilt, and the first and second images 630 and 640 are displayed together through the screen according to the configured transparency of the first image 630, as indicated by reference numeral 610*b*.

As described above, when the tilt changes between the first tilt and the second tilt, the first image 630 output through the screen gradually fades and the second image 640 becomes gradually more visible as the transparency of the first image 630 gradually increases, and likewise, the first image 630 output through the screen becomes gradually more visible and the second image 640 gradually fades as the transparency of the first image 630 gradually decreases.

As illustrated in FIGS. 6A to 6C, the electronic device also outputs information 620 including time, date, weather, etc., on the uppermost layer together with the first image 630 and the second 640. Because the information 620 is displayed on the uppermost layer, the information 620 may be displayed through the screen with constant clarity, regardless of the transparency of the first image 630.

Figure 7A:
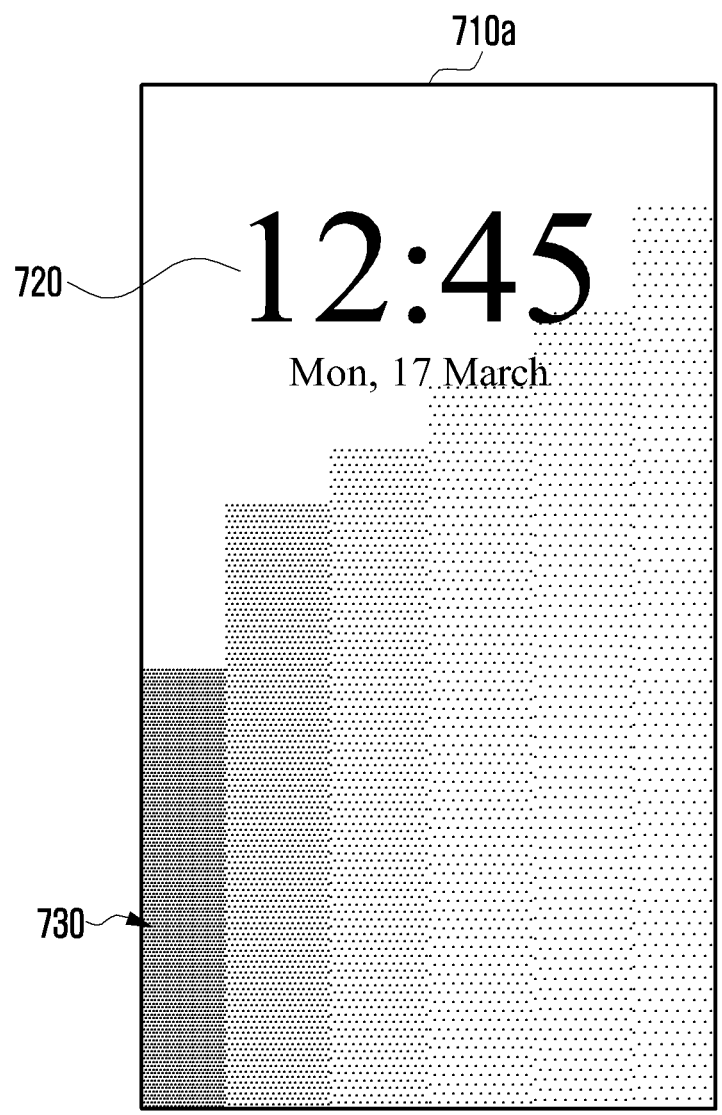
FIGS. 7A to 7C illustrate an example of a display control method of an electronic device according to an embodiment of the present invention.
Figure 7B:
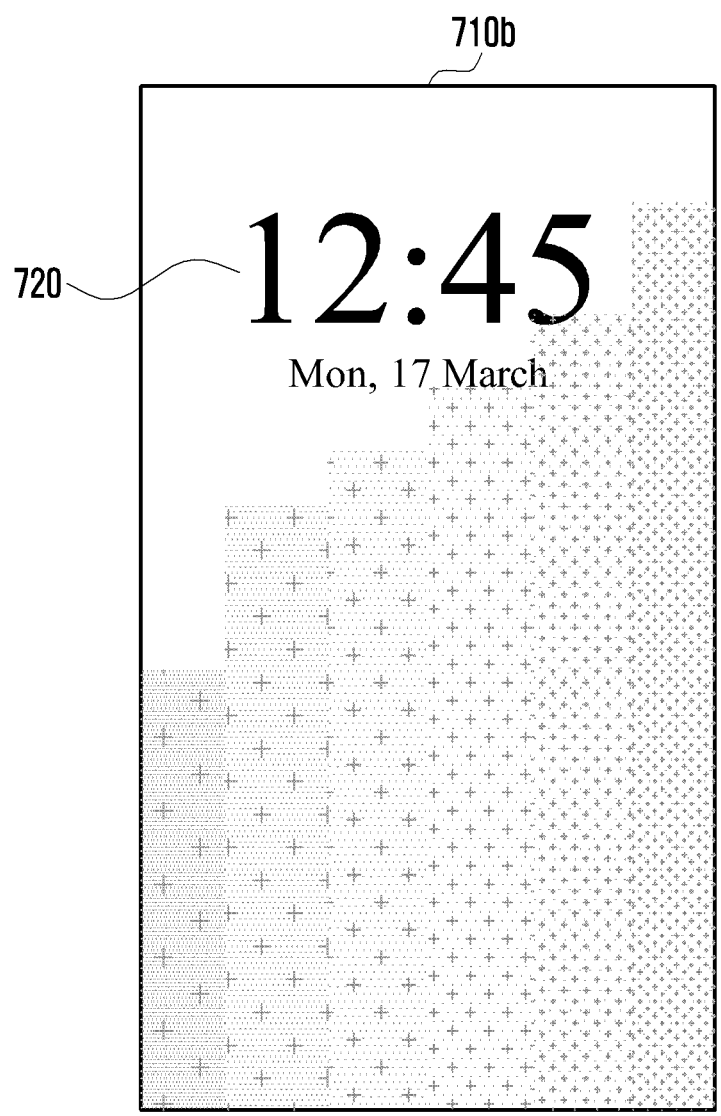
Figure 7C:
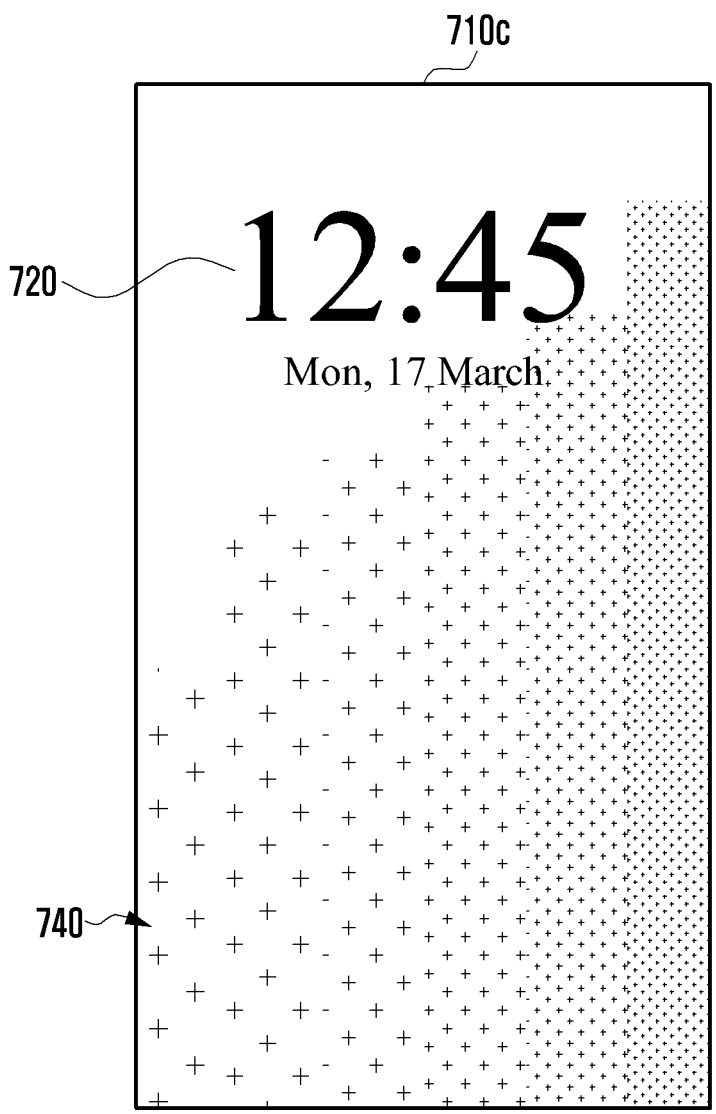

FIGS. 7A to 7C illustrate an example of a display control method of an electronic device according to an embodiment of the present invention.

Referring to FIG. 7A, a lock screen is displayed on the electronic device. As illustrated in FIGS. 7A to 7C, the color of the lock screen changes, as indicated by reference numerals 710*a* to 710*c*, according to the tilt of the electronic device.

For example, the electronic device arranges a first image 730 and a second image 740, which have different colors from each other, vertically on different layers, and outputs the images.

When the tilt of the electronic device corresponds to a first tilt, transparency of the first image 730 on the upper layer is configured to be at the lowest point and the first image 730 is displayed through the screen, as indicated by reference numeral 710*a*. However, when the tilt of the electronic device corresponds to a second tilt, the transparency of the first image 730 is configured to be at the highest point and the second image 740 is displayed through the screen, as indicated by reference numeral 710*c*.

When the tilt of the electronic device corresponds to a tilt between the first tilt and the second tilt, the transparency of the first image 730 is at a value between the lowest point and the highest point, in accordance with the measured tilt, and the first and second images 730 and 740 are displayed together through the screen according to the configured transparency of the first image 730, as indicated by reference numeral 710*b*. In this case, the color of the first image 730 and the color of the second image 740 may be displayed through the screen as if the colors are combined.

As described above, when the tilt changes between the first tilt and the second tilt, the first image 730 output through the screen gradually fades and the second image 740 gradually becomes more visible as the transparency of the first image 730 gradually increases, and likewise, the first image 730 output through the screen becomes gradually more visible and the second image 740 gradually fades as the transparency of the first image 730 gradually decreases.

As illustrated in FIGS. 7A to 7C, the electronic device 100 also output information 720 on an uppermost layer together with the first image 730 and the second image 740. Since the information 720 is displayed on the uppermost layer, the information 720 may be displayed on the screen with the constant clarity, regardless of the transparency of the first image 730.

Figure 8A:
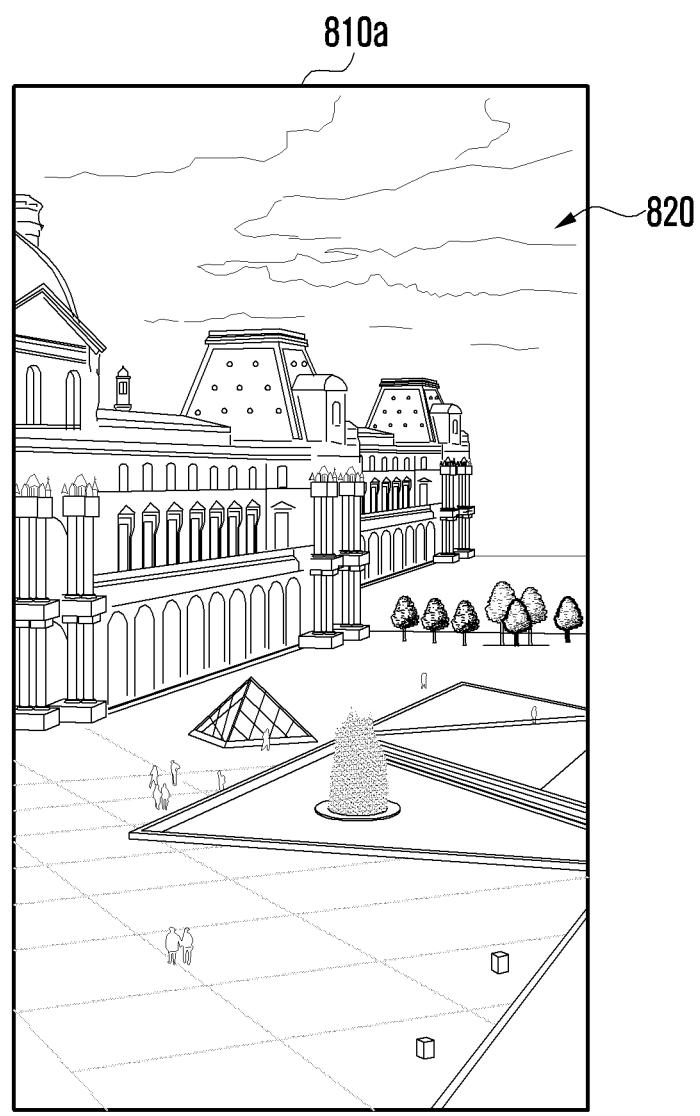
FIGS. 8A and 8B illustrate an example of a display control method of an electronic device according to an embodiment of the present invention.
Figure 8B:
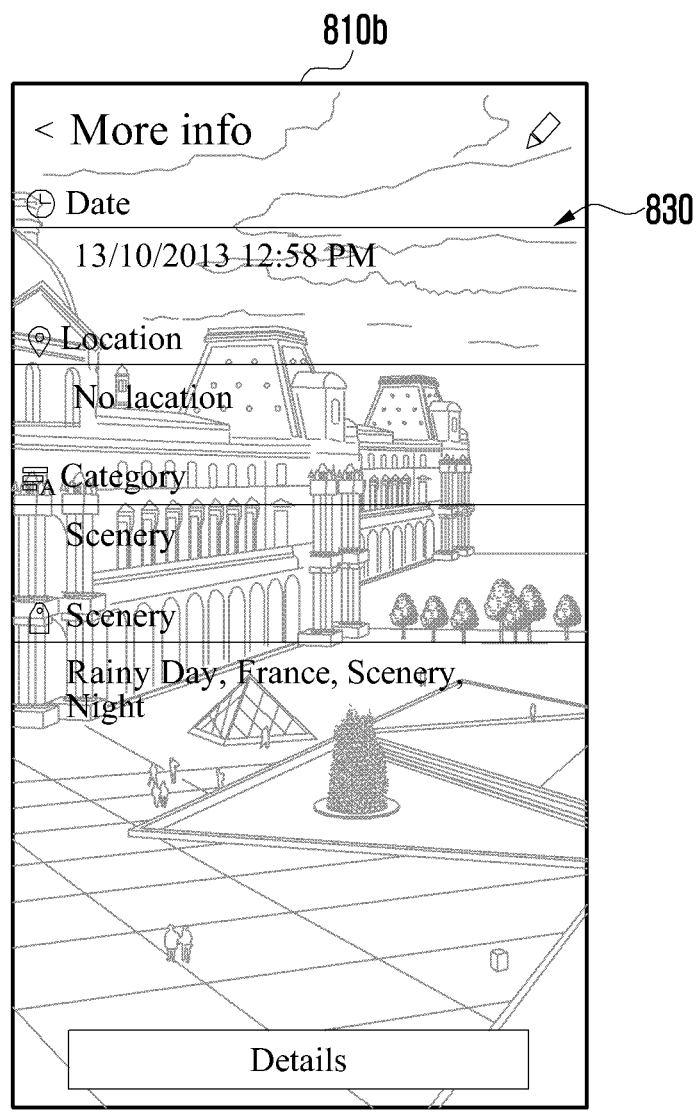

FIGS. 8A and 8B illustrate an example of a display control method of an electronic device according to an embodiment of the present invention.

Referring to FIG. 8A, content, e.g., a photograph, is displayed on the electronic device. For example, in FIGS. 8A and 8B, displays of a photograph and text contents related to the photograph are changed, as indicated by reference numerals 810*a* and 810*b*, according to the tilt of the electronic device.

The electronic device arranges a first image 830 including the text contents related to the photograph and a second image 820 including the photograph vertically on different layers, and outputs the images.

When the tilt of the electronic device corresponds to a first tilt, transparency of the first image 830 on the upper layer is at the highest point and the second image 820, that is, the photograph, is displayed on the screen, as indicated by reference numeral 810*a*. However, when the tilt of the electronic device corresponds to a second tilt, the transparency of the first image 830 is at the lowest point and the first image 830 is displayed on the screen.

When the tilt of the electronic device corresponds to a tilt between the first tilt and the second tilt, the transparency of the first image 830 is at a value between the lowest point and the highest point, in accordance with the measured tilt, and the first and second images 830 and 820 are displayed together through the screen according to the configured transparency of the first image 830, as indicated by reference numeral 810*b*.

As described above, when the tilt changes between the first tilt and the second tilt, the text output through the screen gradually fades and the picture gradually becomes more visible as the transparency of the first image 830 gradually increases, and likewise, the text output through the screen gradually becomes more visible and the picture gradually fades as the transparency of the first image 830 gradually decreases.

According to an embodiment of the present invention, although the transparency of the first image 830 is at the lowest point, the second image 820 on the lower layer may still be displayed in areas of the first image 830 that do not include text.

According to another embodiment of the present invention, when the areas of the first image 830 that do not include any text are configured to be transparent, the text may become more visible or fade gradually, regardless of the clarity of the picture, if the tilt changes between the first tilt and the second tilt.

Figure 9A:
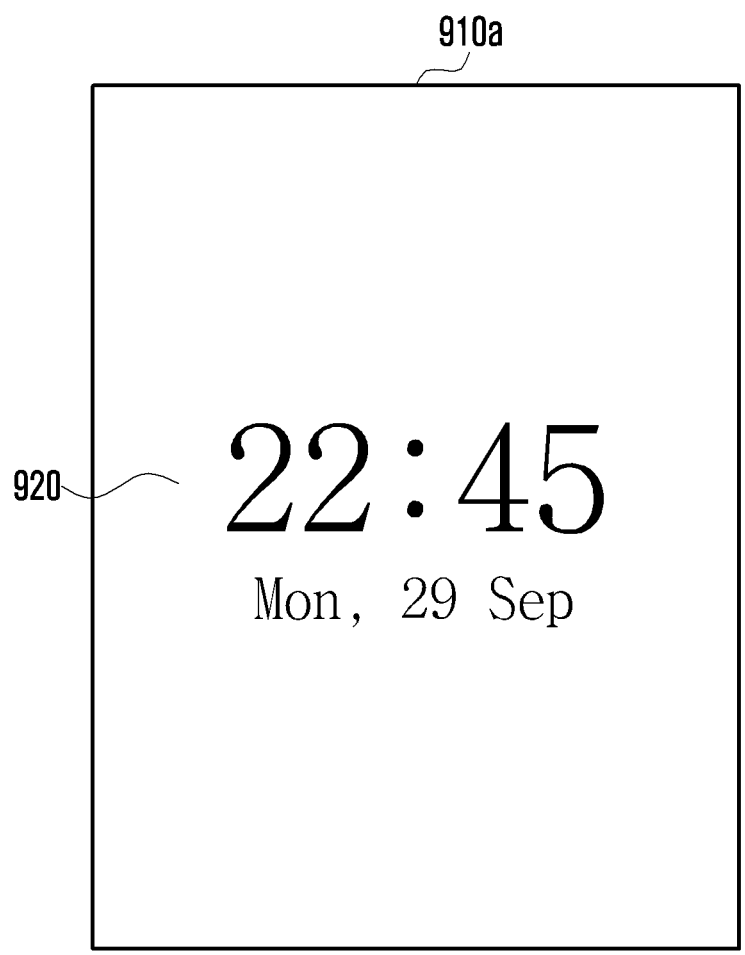
FIGS. 9A to 9C illustrate an example of a display control method of an electronic device according to an embodiment of the present invention.
Figure 9B:
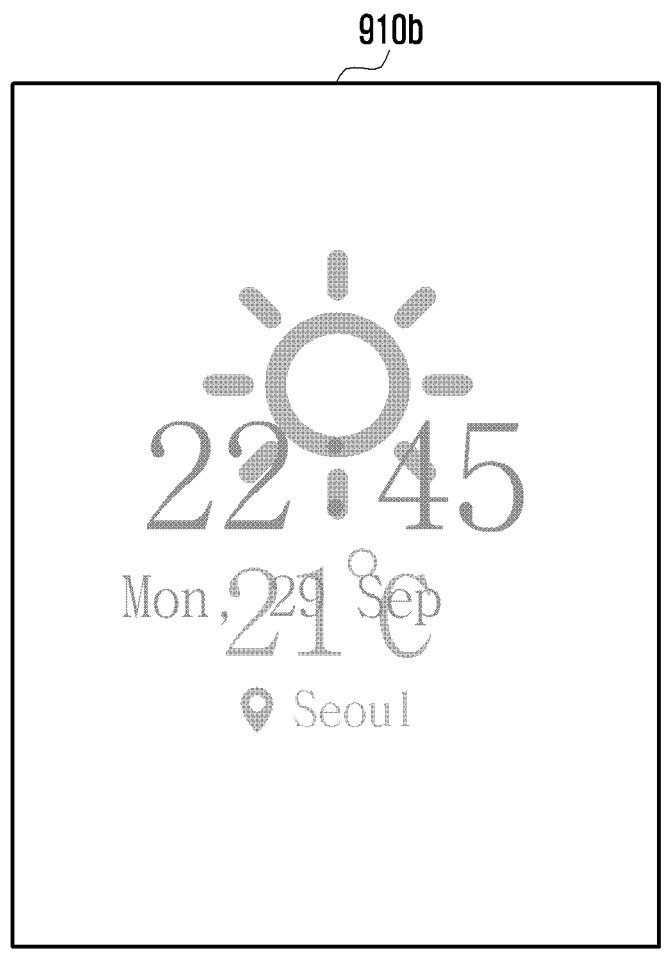
Figure 9C:
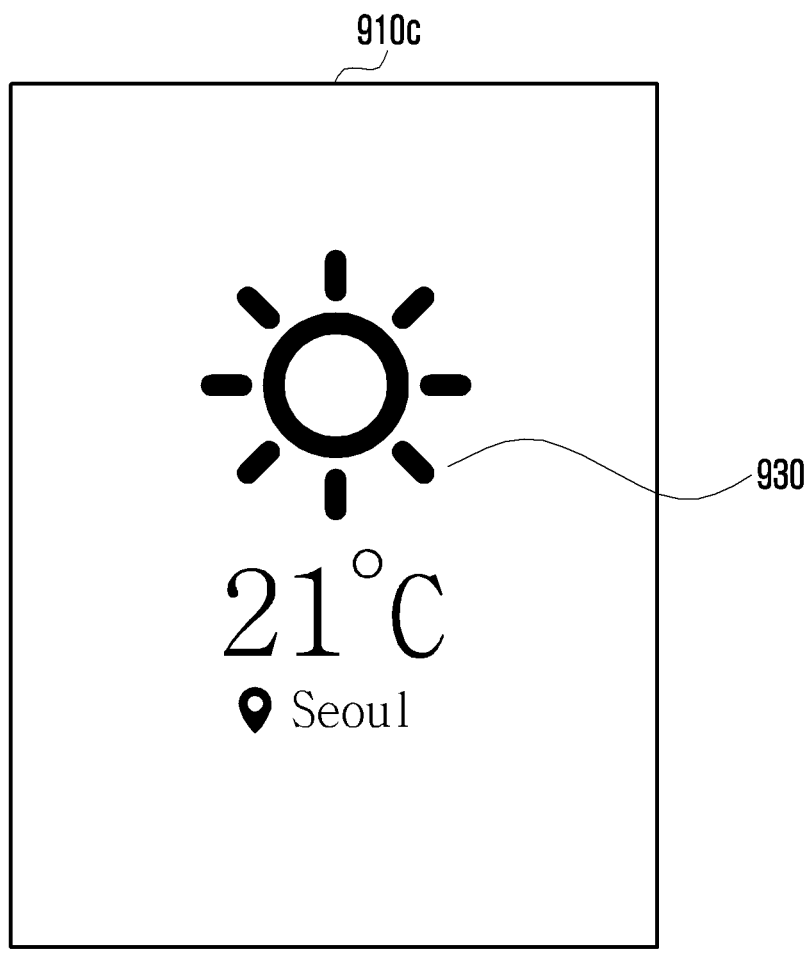

FIGS. 9A to 9C illustrate an example of a display control method of an electronic device according to an embodiment of the present invention.

Referring to FIGS. 9A to 9C, information is displayed on the electronic device. For example, displayed information changes, as indicated by reference numerals 910*a* to 910*c*, according to the tilt of the electronic device.

More specifically, the electronic device arranges a first image 920 and a second image 930, which display different pieces of information, vertically on different layers, and outputs the images. The different pieces of information may be displayed in different forms.

When the tilt of the electronic device corresponds to a first tilt, transparency of the first image 920 on the upper layer is at the lowest point and the first image 920 is displayed on the screen, as indicated by reference numeral 910*a*. However, when the tilt of the electronic device corresponds to a second tilt, the transparency of the first image 920 is at the highest point and the second image 930 is displayed on the screen, as indicated by reference numeral 910*c*.

When the tilt of the electronic device corresponds to a tilt between the first tilt and the second tilt, the transparency of the first image 920 is at a value between the lowest point and the highest point, in accordance with the measured tilt, and the first and second images 920 and 930 are displayed together through the screen, according to the configured transparency of the first image 920, as indicated by reference numeral 910*b*.

As described above, when the tilt changes between the first tilt and the second tilt, the first image 920 output through the screen gradually fades and the second image 930 becomes gradually more visible as the transparency of the first image 920 gradually increases, and likewise, the first image 920 output through the screen becomes gradually more visible and the second image 930 gradually fades as the transparency of the first image 920 gradually decreases.

According to an embodiment of the present invention, the electronic device illustrated in FIGS. 9A to 9C may be a wearable smart wrist watch.

According to another embodiment of the present invention, the smart wrist watch may configure the transparency of the first image 920 to be at the lowest point, when the display is located in a predetermined tilt interval facing the user, e.g., between a certain range. The smart wrist watch may also configure the transparency of the first image 920 to be at the highest point, when the display is located in any of the remaining tilt intervals. Accordingly, when the display of the smart wrist watch faces the user, the smart wrist watch may display the user's personal information through the screen. Otherwise, the smart wrist watch may display general information through the screen.

For example, the first image 920 may include general information, and second image 930 may include the user's personal information. In this case, the smart wrist watch may configure the transparency of the first image 920 to be at the highest point, when the display is located in a predetermined tilt interval facing the user, and configure the transparency of the first image 920 to be at the lowest point, when the display is located in any of the remaining tilt intervals. Accordingly, the smart wrist watch will display the first image 920 when the display is located in a predetermined tilt interval facing the user, and display the second image when the display is located is not located in the predetermined tilt interval.

Figure 10:
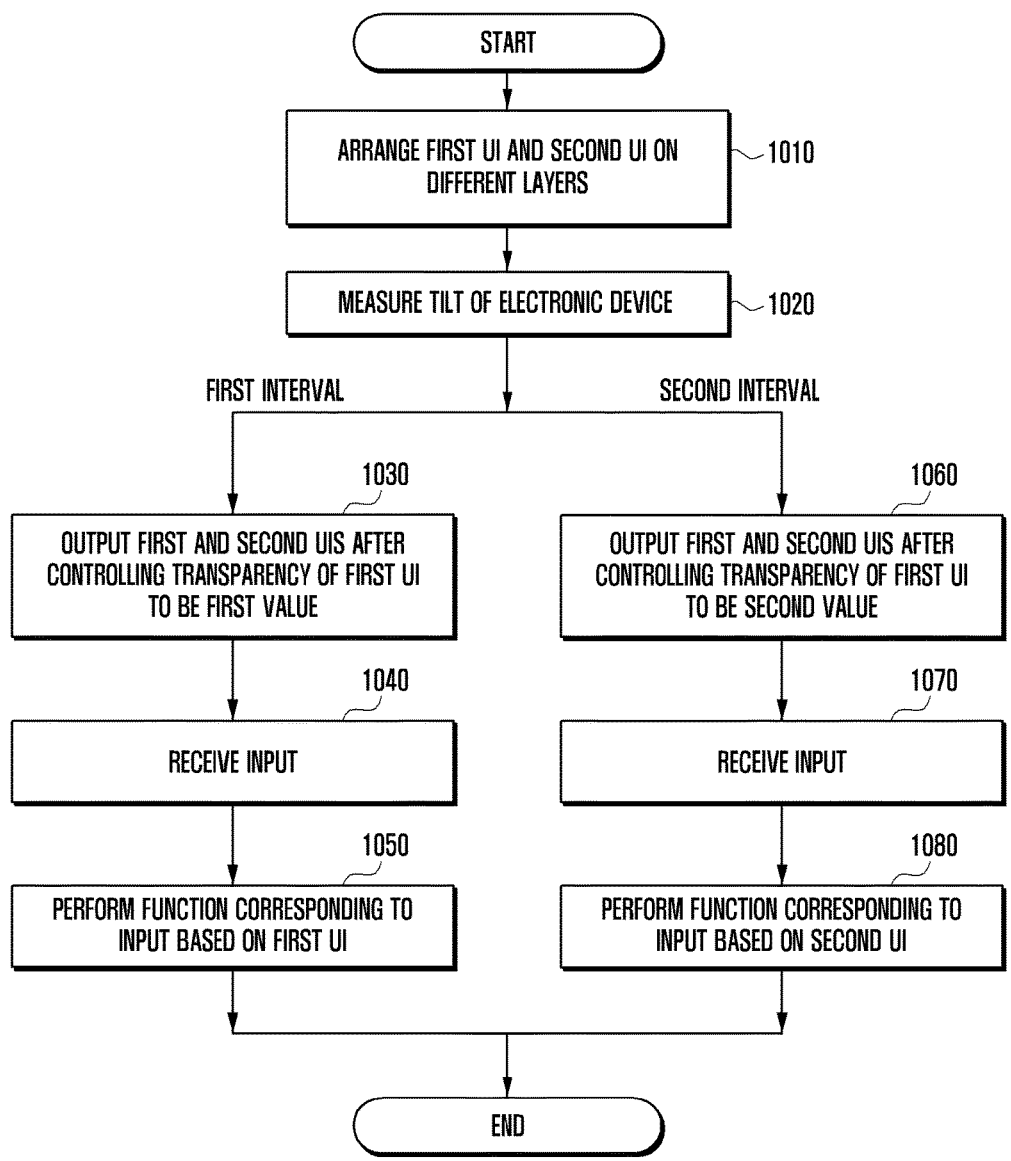
FIG. 10 is a flowchart illustrating a display control method of an electronic device according to an embodiment of the present invention.

FIG. 10 is a flowchart illustrating a display control method of an electronic device according to an embodiment of the present invention. For example, the method of FIG. 10 will be described as being performed by the electronic device illustrated in FIG. 1.

Referring to FIG. 10, in step 1010, the controller 150 arranges a first UI and a second UI vertically on different layers. For example, the first UI may be arranged on an upper layer and the second UI may be arranged on a lower layer. A user may execute various functions of the electronic device through the UIs, which include, e.g., an object such as a virtual button or an icon linked to a predetermined function.

In step 1020, the controller 150 measures the tilt of the electronic device through the sensor unit 120, e.g., as illustrated in FIGS. 4A and 4B.

When the measured tilt of the electronic device 100 is in a first interval, in step 1030, the controller 150 outputs the first UI and the second UI and controls transparency of the first UI to be a first value. For example, the first value may be the lowest value, such that the first UI is displayed through the screen of the display unit 130. Accordingly, when a user input, for example, a touch input is received through the touch screen in step 1040, the controller 150 performs a function corresponding to the user input based on the first UI displayed on the screen in step 1050.

However, when the measured tilt of the electronic device is in a second interval, in step 1060, the controller 150 outputs the first UI and the second UI and controls transparency of the first UI to be a second value. For example, the second value may be the highest value, such that the second UI is displayed through the screen of the display unit 130. Accordingly, when a user input, for example, a touch input is received through the touch screen in step 1070, the controller 150 performs a function corresponding to the user input based on the second UI displayed on the screen in step 1080.

Figure 11A:
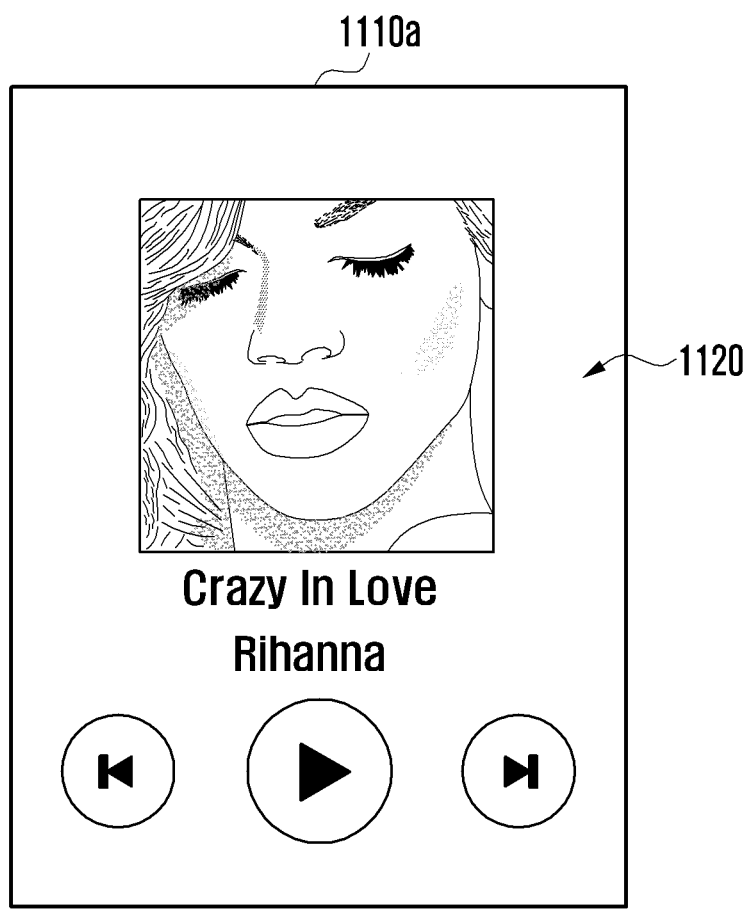
FIGS. 11A to 11C illustrate an example of a display control method of an electronic device according to an embodiment of the present invention.
Figure 11B:
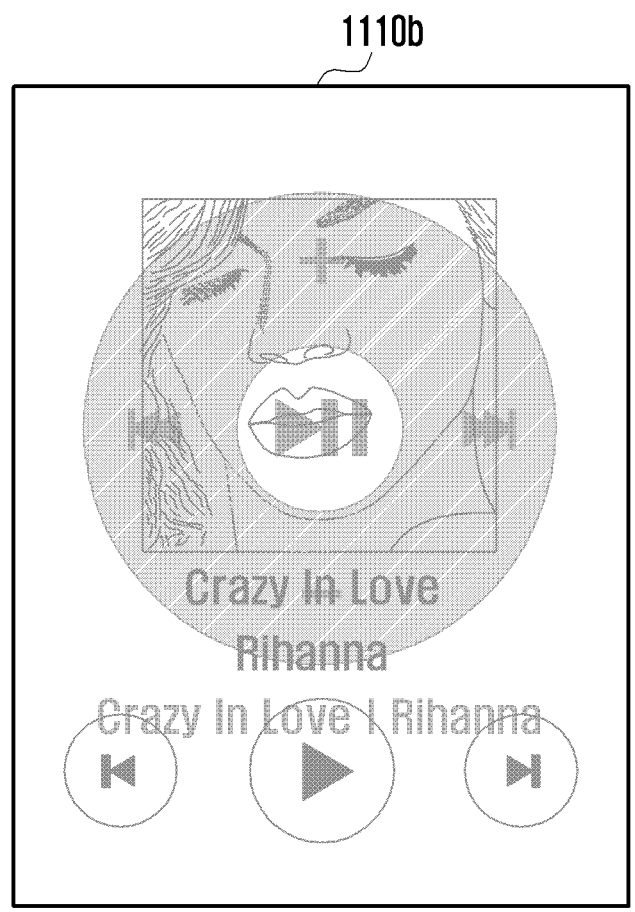
Figure 11C:
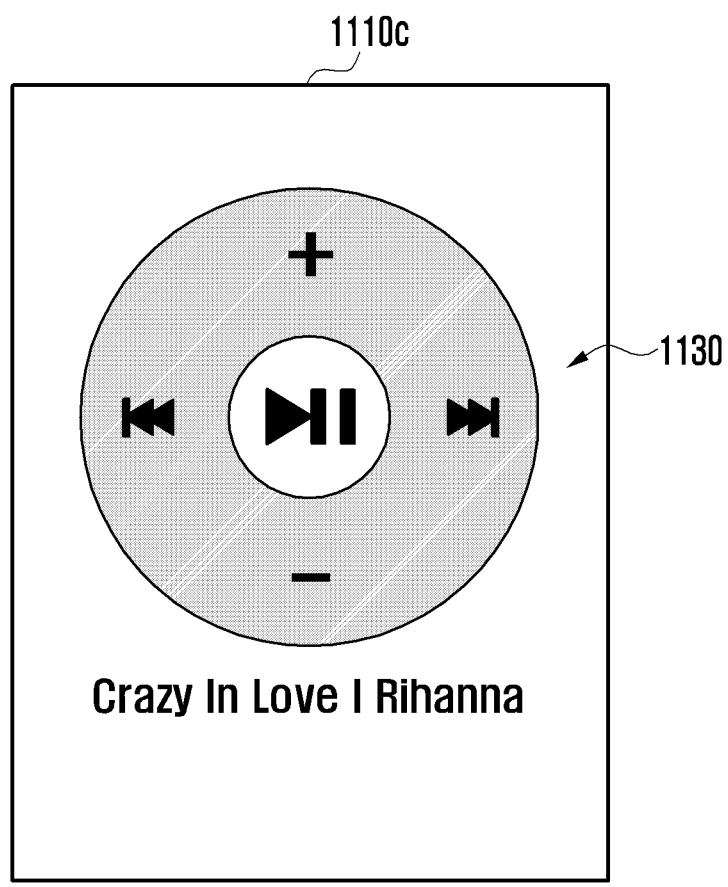

FIGS. 11A to 11C illustrate an example of a display control method of an electronic device according to an embodiment of the present invention.

Referring to FIGS. 11A to 11C, a UI is displayed on the electronic device. For example, the UI may change, as indicated by reference numerals 1110*a* to 1110*c*, according to the tilt of the electronic device.

More specifically, the electronic device arranges a first UI 1120 and a second UI 1130, which are different from each other, vertically on different layers, and outputs the images. For example, the different UIs include different objects, for example, virtual buttons and icons.

When the tilt of the electronic device corresponds to a first tilt, transparency of the first UI 1120 on the upper layer is at the lowest point and the first UI 1120 is displayed on the screen, as indicated by reference numeral 1110*a*. Accordingly, the user may provide an input for the displayed first UI 1120 to perform a function related to the first UI 1120.

However, when the tilt of the electronic device corresponds to a second tilt, the transparency of the first UI 1120 is at the highest point and the second image 1130 is displayed through the screen, as indicated by reference numeral 1110*c*. Accordingly, the user may provide an input for the displayed second UI 1130 to perform a function related to the second UI 1130.

When the tilt of the electronic device changes from the first interval to the second interval or from the second interval to the first interval, the electronic device provides the screen, as indicated by reference numeral 1110*b*, in which the first UI 1120 switches to the second UI 1130 or the second UI 1130 switches to the first UI 1120, by controlling the transparency of the first UI 1120.

Figure 12A:
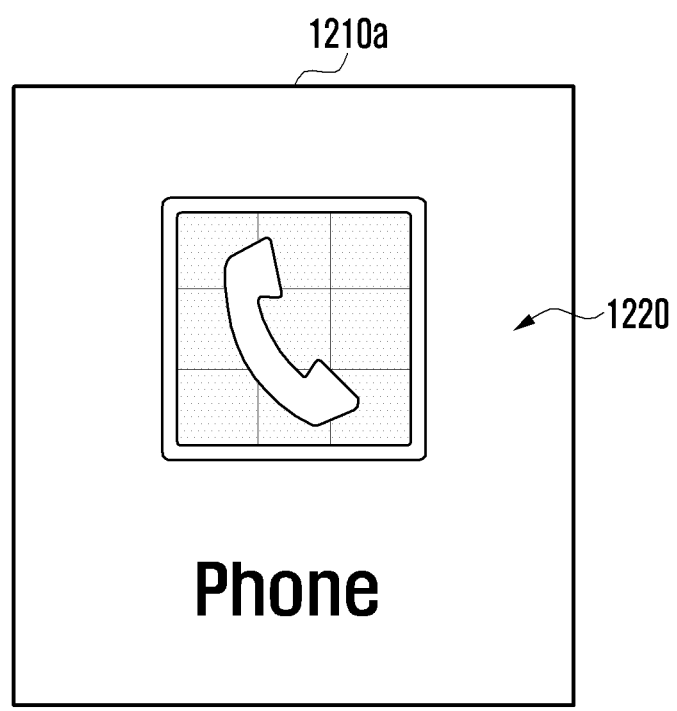
FIGS. 12A to 12C illustrate an example of a display control method of an electronic device according to an embodiment of the present invention.
Figure 12B:
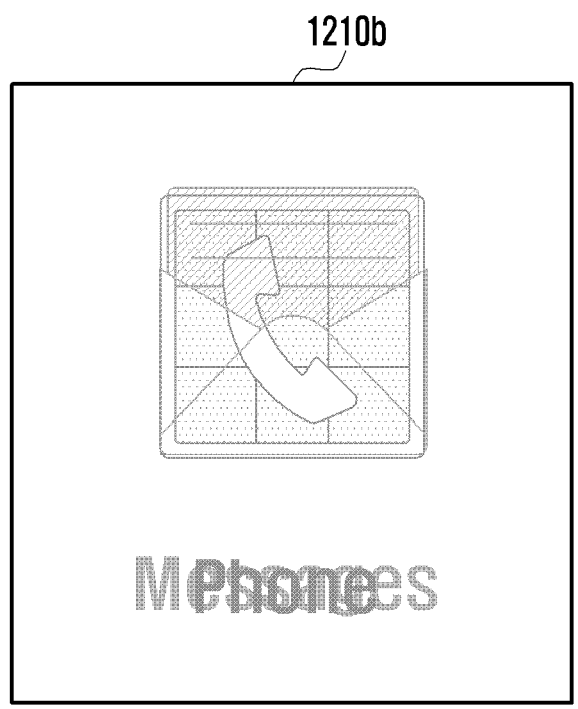
Figure 12C:
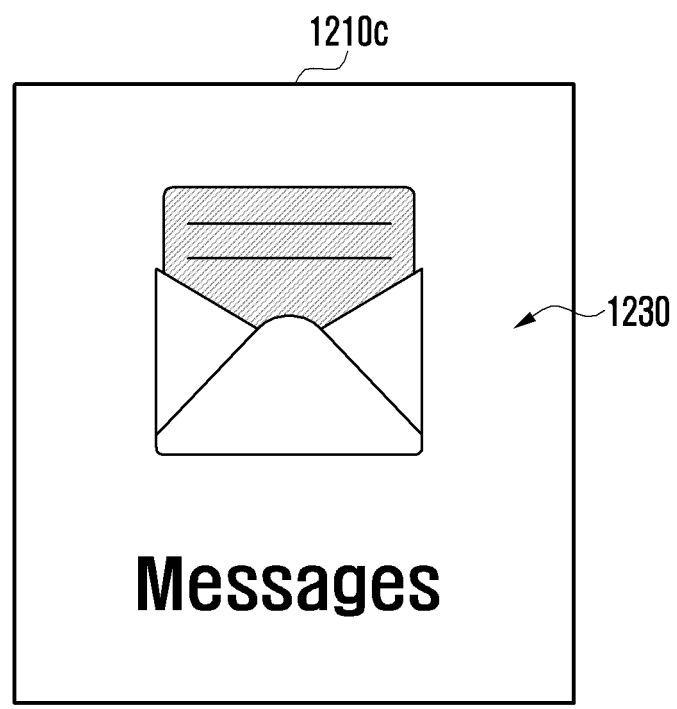

FIGS. 12A to 12C illustrate an example of a display control method of an electronic device according to an embodiment of the present invention.

Referring to FIGS. 12A to 12C, a UI is displayed on an electronic device. For example, the UI may be changed, as indicated by reference numerals 1210*a* to 1210*c*, according to the tilt of the electronic device.

More specifically, the electronic device arranges a first UI 1220 and a second UI 1230, which are different from each other, vertically on different layers, and outputs the images. The different UIs may include different objects, for example, icons.

When the tilt of the electronic device corresponds to a first tilt, transparency of the first UI 1220 on the upper layer is at the lowest point and the first UI 1220 is displayed on the screen, as indicated by reference numeral 1210*a*. Accordingly, the user may provide an input for the icon of the displayed first UI 1220 to perform a function related to the selected icon. However, when the tilt of the electronic device corresponds to a second tilt, the transparency of the first UI 1220 is at the highest point and the second UI 1230 is displayed on the screen, as indicated by reference numeral 1210*c*. Accordingly, the user may provide an input for the icon of the displayed second UI 1230 to perform a function related to the selected icon.

When the tilt of the electronic device changes from the first interval to the second interval or from the second interval to the first interval, the electronic device may provide the screen in which the first UI 1220 switches to the second UI 1230 or the second UI 1230 switches to the first UI 1220, by controlling the transparency of the first UI 1220.

At least some of the above-described embodiments of the present invention may be implemented by a command stored in a computer-readable storage medium in a programming module form. When the command is executed by one or more processors, the one or more processors may perform a function corresponding to the command. The computer-readable storage medium may be, for example, the storage or the memory. At least some of the programming modules may be implemented (or executed) by, for example, the processor. At least some of the programming modules may include a module, a program, a routine, a set of instructions, or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

A programming module according to an embodiment of the present invention may include one or more of the aforementioned components or may further include other additional components, or some of the aforementioned components may be omitted. Operations executed by a module, a programming module, or other component elements according to various embodiments of the present invention may be executed sequentially, in parallel, repeatedly, or in a heuristic manner. Further, some operations may be executed according to another order or may be omitted, or other operations may be added.

As described above, in a display control method of an electronic device according to an embodiment of the present invention, a user can receive various images or functions through a display by controlling the tilt of the electronic device.

Further, an electronic device according to an embodiment of the present invention can switch and provide a plurality of images through a display, and provide an emotional effect in image switching by arranging a plurality of images on different layers and controlling transparency of the image on an upper layer according to a measured tilt.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of controlling a display of an electronic device, the method comprising:
    arranging a first image and a second image on different layers of a vertical layer stack, the first image being arranged on an upper layer to the second image;
    measuring a tilt of the electronic device;
    determining which of the first image and the second image to display based on whether the measured tilt is within a predetermined tilt interval and the display is facing a user of the electronic device;
    displaying the first image by controlling transparency of the first image based on the measured tilt, in response to determining that the measured tilt is within the predetermined tilt interval and the display is facing the user;
    displaying the second image by controlling the transparency of the first image based on the measured tilt, in response to determining that the measured tilt is not within the predetermined tilt interval;
    outputting additional information on an uppermost layer of the vertical layer stack; and
    when the tilt of the electronic device is changing from the first interval to the second interval, displaying a screen including the first UI and the second UI, based on the change of the transparency of the first UI,
    wherein each of the first image and the second image includes at least one of a pattern, a color, information, contents, and a User Interface (UI),
    wherein the first image and the second image are different from each other,
    wherein the first image includes a first UI and the second image includes a second UI, and
    wherein controlling transparency of the first image comprises:
        when the tilt of the electronic device is in a first interval, controlling transparency of the first UI to be a first value; and when the tilt of the electronic device is in a second interval, controlling the transparency of the first UI to be a second value.

2. The method of claim 1, wherein measuring the tilt of the electronic device comprises measuring the tilt based on at least one of a first axis and a second axis, which is orthogonal to the first axis.

3. The method of claim 1, wherein controlling the transparency of the first image comprises:
when the tilt of the electronic device changes from a first tilt to a second tilt, increasing the transparency of the first image in accordance with the change; and
when the tilt of the electronic device changes from the second tilt to the first tilt, decreasing the transparency of the first image in accordance with the change.

4. The method of claim 1, further comprising displaying predetermined information with at least one of the first image and second image.

5. The method of claim 1, wherein the first image includes text and the second image includes a picture.

6. The method of claim 1, further comprising:
receiving a first user input through the first UI and performing a first function corresponding to the first input based on the first UI, if the tilt of the electronic device is in the first interval; and
receiving a second user input through the second UI and performing a second function corresponding to the second input based on the second UI, if the tilt of the electronic device is in the second interval.

7. An electronic device comprising:
a display unit;
a sensor unit that measures a tilt of the electronic device; and
controller that:
arranges a first image and a second image on different layers of a vertical layer stack, the first image arranged on an upper layer to the second image,
determines which of the first image and the second image to display based on whether the measured tilt is within a predetermined tilt interval and the display unit is facing a user of the electronic device,
displays, through the display unit, the first image by controlling transparency of the first image based on the measured tilt, in response to determining that the measured tilt is within the predetermined tilt interval and the display is facing the user,
displays, through the display unit, the second image by controlling the transparency of the first image based on the measured tilt, in response to determining that the measured tilt is not within the predetermined tilt interval;
outputs additional information on an uppermost layer of the vertical layer stack; and
when the tilt of the electronic device is changing from the first interval to the second interval, the controller displays, through the display unit, a screen including the first UI and the second UI, based on the change of the transparency of the first UI,
wherein each of the first image and the second image includes at least one of a pattern, a color, information, contents, and a User Interface (UI),
wherein the first image and the second image are different from each other,
wherein the first image includes a first UI and the second image includes a second UI, and
wherein the controller controls transparency of the first UI to be a first value such that the first UI is displayed, when the tilt of the electronic device is in a first interval, and controls the transparency of the first UI to be a second value such that the second UI is displayed, when the tilt of the electronic device is in a second interval.

8. The electronic device of claim 7, wherein the controller measures the tilt based on at least one of a first axis and a second axis, which is orthogonal to the first axis.

9. The electronic device of claim 7, wherein the controller increases the transparency of the first image in accordance with a change of the tilt, when the tilt of the electronic device changes from a first tilt to a second tilt, and decreases the transparency of the first image in accordance with the change of the tilt, when the tilt of the electronic device changes from the second tilt to the first tilt.

10. The electronic device of claim 7, wherein the controller arranges a layer of a third image between the layers of the first image and the second images, and displays at least one of the first image, the second image, and the third image by controlling transparency of the third image based on the measured tilt.

11. The electronic device of claim 7, wherein the controller displays predetermined information with at least one of the first image and second image.

12. The electronic device of claim 7, wherein the first image includes text and the second image includes a picture.

13. The electronic device of claim 7, wherein, when the tilt of the electronic device is in the first interval and a first input is received, the controller performs a function corresponding to the first input based on the first UI, and
wherein, when the tilt of the electronic device is in the second interval and a second input is received, the controller performs a function corresponding to the second input based on the second UI.

* * * * *